United States Patent [19]
Myers

[11] 3,870,931
[45] Mar. 11, 1975

[54] SOLENOID SERVOMECHANISM
[75] Inventor: John L. Myers, Dayton, Ohio
[73] Assignee: Sun Chemical Corporation, New York, N.Y.
[22] Filed: Feb. 4, 1974
[21] Appl. No.: 439,324

[52] U.S. Cl.................................. 317/146, 318/599
[51] Int. Cl. ............................................ G05b 11/28
[58] Field of Search ............ 317/146; 318/599, 631, 318/637, 663, 664, 681, 687

[56] References Cited
UNITED STATES PATENTS
3,436,629  4/1969  Adler.................................. 318/599
3,745,420  7/1973  Häfner............................ 318/599 X OTHER PUBLICATIONS
"Analog to Pulse-Width Converter" by Rudy Panholzer Instruments & Control Systems 1968, Vol. 41 pp. 129–130.

Primary Examiner—J. D. Miller
Assistant Examiner—Harry E. Moose, Jr.
Attorney, Agent, or Firm—Dybvig & Dybvig

[57] ABSTRACT

A solenoid servomechanism comprises an armature and coil means regulable by a command signal to effect a displacement of the armature. Feedback means monitoring the position of the armature relay a signal representative of armature position to the summing point of an operational amplifier where the armature position signal is compared with the command signal. The difference between the command signal and the position signal is amplified and placed in proper phase relationship to correct the difference. The resultant signal is then converted into one or more pulsating or switching mode signals which modulate the duty cycle of one or more power drivers whose outputs are applied to the coil means for correction of the armature position.

In a two-coil, one-armature embodiment, the armature is electrically driven on command in either of two directions, the direction determined by the respective duty cycles imposed on power drivers for the two coils, such duty cycles dependent on the difference between the command signal and the position feedback means. In a single coil, one-armature embodiment, the single coil acts in response to a command signal to advance against a resilient load capable of returning the armature in an opposite direction upon relaxation of the command signal.

In both of the foregoing embodiments, the command signal may be a signal of unknown value which is measured by the displacement of the armature. Alternatively, the command signal may be of a known or adjusted value whereby the armature may be displaced from a first position to a desired second position.

7 Claims, 12 Drawing Figures

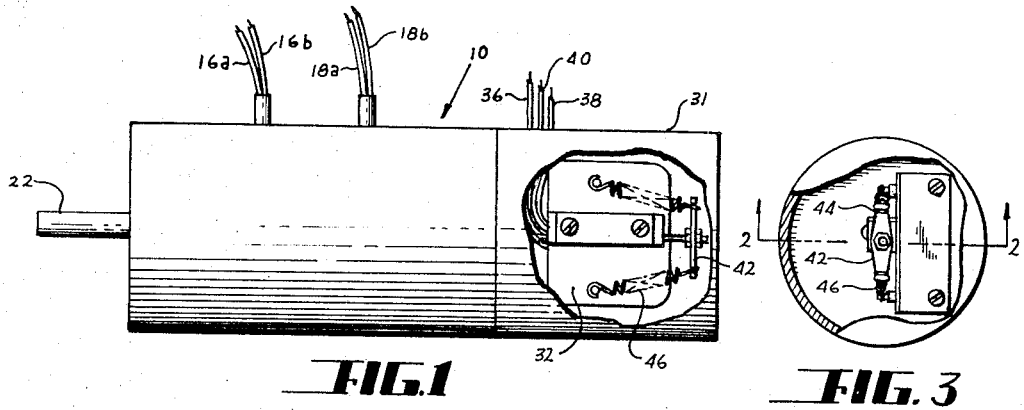
FIG.1
FIG.3
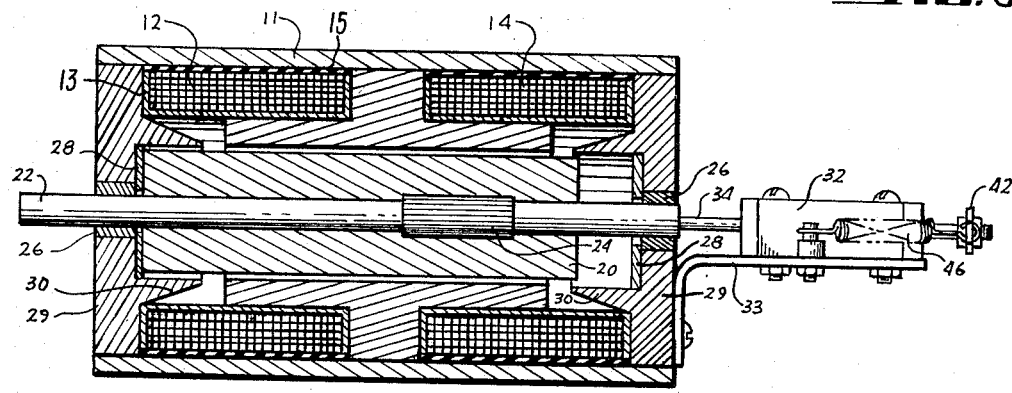
FIG.2
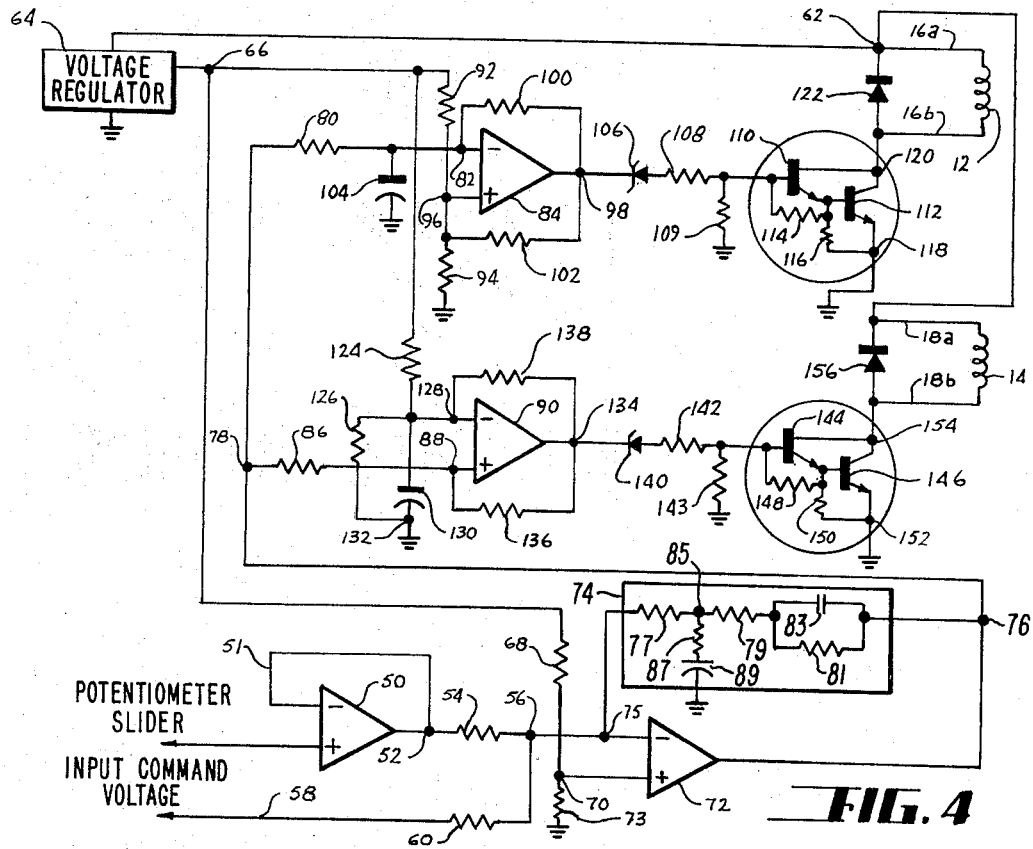
FIG.4

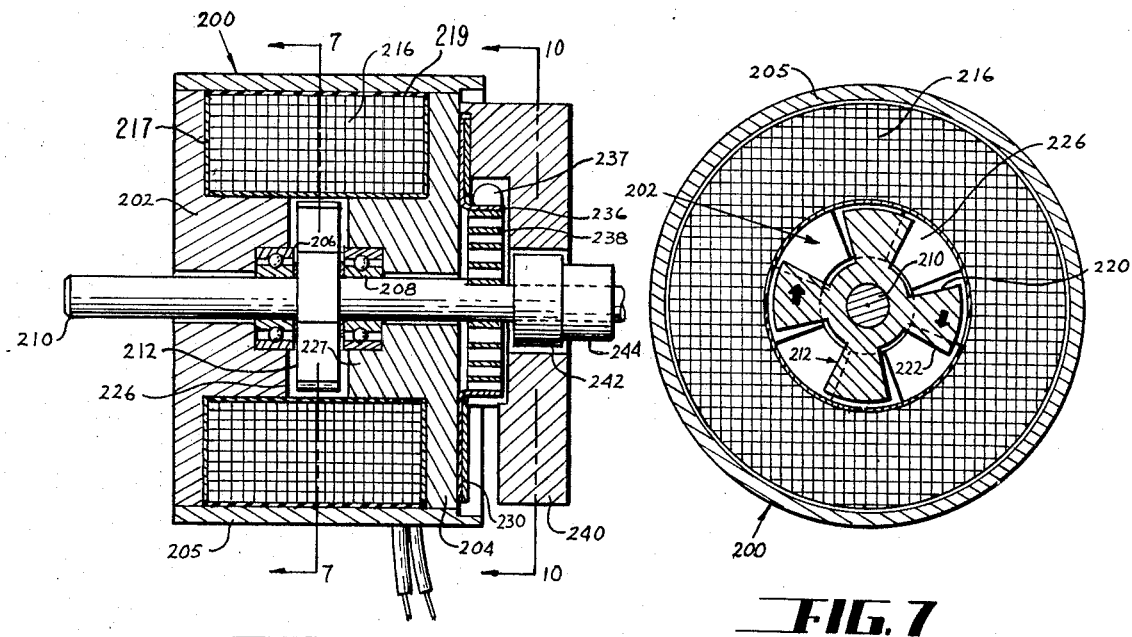
FIG. 6
FIG. 7
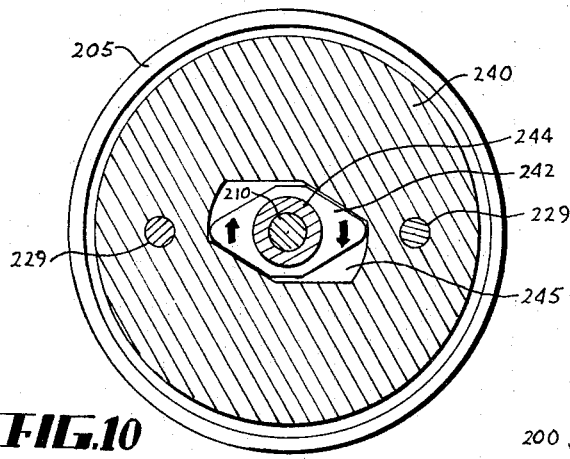
FIG. 10
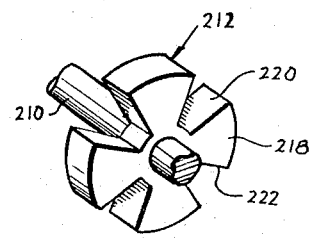
FIG. 8
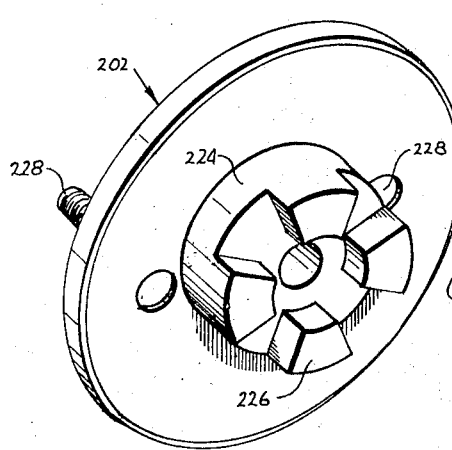
FIG. 9
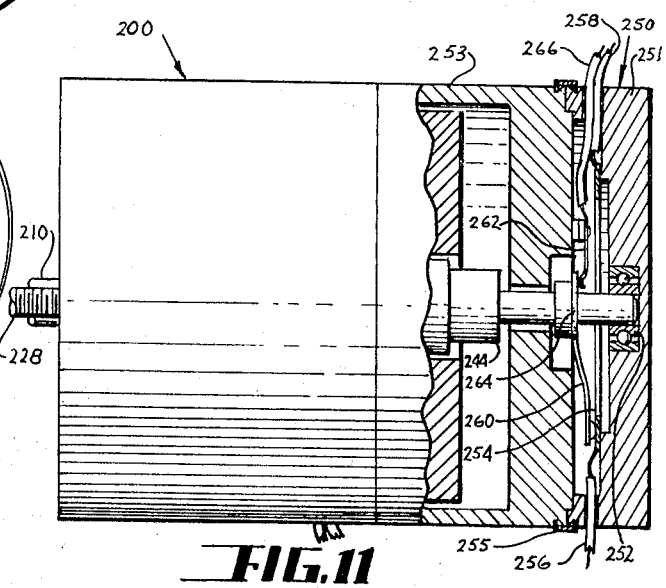
FIG. 11

3,870,931

SOLENOID SERVOMECHANISM

BACKGROUND OF THE INVENTION

1. Field of the Invention

This invention relates to servomechanisms for displacing load devices in response to command signals and more particularly to such a device utilizing a solenoid or related electromagnetic device to directly control the load position without any intervening linkage. Still more particularly, the present invention relates to a solenoid controlled servomechanism operating in a pulsating or switching mode.

2. Description of the Prior Art

Prior art devices which are within the general field of the present invention as above described appear in U.S. Pat. Nos. 3,172,025, 3,243,238, 2,639,824, 1,955,676, 2,602,911, 2,989,666, 3,416,052 and 3,671,814. Solenoid devices exhibiting stroke characteristics which render them suitable for use in servomechanisms of the type described in this application also appear in U.S. Pat. Nos. 3,435,394, 3,753,180 and in German Auslegeschrift No. 1,270,178.

An object of the present invention is to provide a new and improved solenoid servomechanism.

Another object of the present invention is to provide a solenoid servomechanism in which the forces exerted by one or more solenoids in the mechanism are controlled by controlling the duty cycle according to which power is supplied to the solenoids.

Other objects and advantages reside in the construction of parts, the combination thereof, the method of manufacture and the mode of operation, as will become more apparent from the following description.

SUMMARY OF THE INVENTION

In the present invention a solenoid device having a predetermined path of motion, such as a rotary or linear path, is operatively connected to a position sensing device which is coupled in a feedback circuit to the summing junction of an operational amplifier. At the summing junction the feedback signal which is then an inverted signal is added to an input command signal. The resulting difference signal, which is an indication of the error magnitude and direction from the position directed by the input command signal, is amplified and applied to a power driver for a solenoid coil in the appropriate phase relationship to reduce the output error. The amplifier circuitry is operated with high gain with the result that the solenoid will be forced to a position where little difference exists between the feedback signal and the input command. The power driver utilized to energize the solenoid in response to the aforementioned difference signal is operated switching mode so as to reduce power dissipation in the driver circuitry and to provide a dither which substantially reduces solenoid friction as well as magnetic hysteresis.

In a preferred embodiment the difference signal is applied to two operational amplifiers coupled over separate power drivers to separate solennoid coils and so phased as to act oppositely on a single armature.

BRIEF DESCRIPTION OF THE DRAWINGS

In the drawings:

FIG. 1 is an elevation view with a portion broken away illustrating a solenoid servomechanism suitable for use in the present invention.

FIG. 2 is a section view taken substantially along the line 2—2 of FIG. 3.

FIG. 3 is an end elevation view, with a portion broken away, of the structure shown in FIG. 1.

FIG. 4 is a schematic circuit diagram illustrating circuitry suitable for use in a preferred embodiment.

FIG. 6 is a section view of a modified solenoid structure suitable for use in the present invention.

FIG. 7 is a section view taken substantially along the line 7—7 of FIG. 6.

FIG. 8 is a perspective view with portions broken away illustrating the armature for the solenoid structure of FIGS. 6 and 7.

FIG. 9 is a perspective view illustrating a pole piece for the solenoid structure of FIGS. 6 and 7.

FIG. 10 is a section view taken substantially along the line 10—10 of FIG. 6.

FIG. 11 is an elevation view, with portions broken away, illustrating potentiometer means attached to the solenoid structure of FIGS. 6 and 7.

DESCRIPTION OF THE INVENTION

Figure 12:
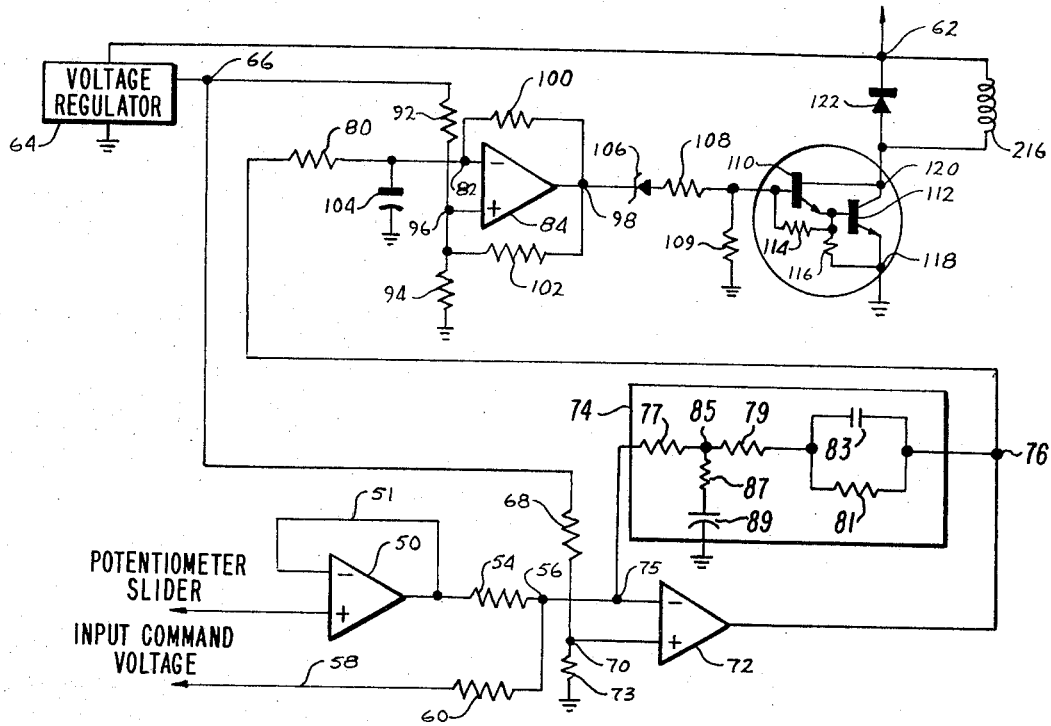
FIG. 12 is a schematic circuit diagram of circuitry suitable for use in the operation of the modification.

FIGS. 1, 2 and 3 illustrate a solenoid assembly 10 suitable for use in the present invention. The assembly 10 comprises a ferromagnetic casing 11 which receives two axially spaced solenoid coils 12 and 14. The coils 12 and 14 are preferably wound in bobbins 13, which comprise a conductive material such as aluminum, and are wrapped at their outer peripheries with a nonconductive tape 15. The bobbins 13 may also be anodized to render only their exposed surfaces nonconducting. The solenoid coil 12 has input leads 16a and 16b which are connected to the opposite ends of the wire forming the coil. Likewise, the solenoid coil 14 has input leads 18a and 18b.

Disposed within the coils 12 and 14 for axial movement with respect thereto is a ferromagnetic armature 20. While the armature appears as one elongate body, it will become apparent from the following description that the two ends of the armature are independently flux linked to opposite end portions of the casing 11 and the armature could be two ferromagnetic bodies connected together by means which need not be ferromagnetic. The armature 20 surrounds a shaft 22 and is affixed to the shaft 22 by knurling 24. The opposite ends of the shaft are supported for axial movements in suitable sleeve bearings 26 which are supported by ferromagnetic end plates 29 press fitted into the casing 11. Non-magnetic washers 28 interposed between the armature 20 and each of the end plates 29 give the armature 20 an accurately sized path for free movement between the end plates 29. Each of the end plates 29 has an integrally formed outwardly tapered wall 30 which encircles the armature 20. It can be noted that the walls 30 taper from a relatively wide base to a relatively narrow apex and are of such an axial dimension that the armature 20 never excapes encirclement by both of the walls 30.

As shown in FIG. 1, the assembly 10 includes a housing 31 mounted to and projecting axially from the casing 11. Supported within the housing 31 by a bracket 33 affixed to the adjacent end plate 29 is a potentiometer 32 having an axially movable slide member 34.

The member 34 includes a sliding center tap, not shown, for wiping a potentiometer resistance. A potentiometer of the type described is available commercially under Model No. 5141 from Bourns Inc., Instrument Division, located in Riverside, Cal.

The potentiometer resistance is connected between lead wires marked 36 and 38 in FIG. 1. The aforementioned center tap connects electrically to a lead wire 40.

Affixed to one end of the slide member 34 is an anchor plate 42 which is notched as shown at 44 for engagement with coil springs 46 disposed symmetrically on opposite sides of the wiper member. The springs 46 cooperate to bias the slide member against one end of the shaft 22. As a result, the slide member 34 is caused to follow the movements of the armature 20 but it is to be understood that the springs 46 are relatively weak in relation to any magnetic force developed within the assembly 10 and accordingly the wiper member 34 ordinarily does not drive the armature.

It will be noted that the coils 12 and 14, when energized, attract the armature 20 oppositely into each of the circular walls 30. The taper of the walls 30 creates a force declining region within the volume surrounded thereby. Thus, if the coils 12 and 14 are energized equally, the armature 20 will seek a position centered between the ends of the solenoid assembly. On the other hand, if either of the coils 12 and 14 carries more current than the other, the armature will move further into the annular wall 30 encircled by the coil carrying the higher current. The armature will be held stably in the latter position by reason of the declining magnetic force characteristic imparted by the tapered walls 30.

The damping effect of the coil bobbins 13, which may be enhanced by a viscous lubricant, is utilized to quickly stabilize the armature at any position dictated by the coils 12 and 14.

In the present invention, the foregoing operating characteristics are utilized in conjunction with circuitry which includes a means to sense the armature position and also includes a means commanding an armature position. The circuit function is to equalize the command signal and the position signal. More particularly, the position sensing means is included in a feedback circuit for a power control means which simultaneously adjusts the current flow in both coils so as to cause an armature movement which corrects any departure between the position and command signals.

In normal operation, the command means determines the position to which the armature is to move and the power control means will develop whatever force is necessary within the circuit capabilities to move the armature to its commanded position and hold the armature at such position against externally applied forces.

Having reference to the drawings, the position sensing means illustrated therein is the potentiometer slide 34 which, as described, is capable of following all armature movements. The potentiometer 32 is supplied with any suitable source of direct current voltage applied across the terminals 36 and 38. While not shown in the drawing, the voltage applied to the potentiometer may be derived from a voltage regulator 64 which will be described in reference to FIG. 4. The armature position thus determines the voltage which will appear at the terminal 40. Such voltage is applied to the non-inverting terminal of an input buffer 50 having conventional biasing means. The inverting terminal of the input buffer 50 is strapped by the conductor 51 to the output to buffer junction 52. One function of the buffer 50 is to allow the voltage appearing on the terminal 40 to be utilized by the circuitry described without appreciable drain from the potentiometer 32.

The output of the buffer 50 is connected over a gain setting resistance 54 to the inverting input 75 of a operational amplifier 72. The amplifier 72 has conventional biasing not shown and functions as a summing means, frequency compensation, and gain means. Joined to the same input 75 over a gain setting resistance 60 connecting to a circuit node 56 is a conductor 58 adapted to receive any arbitrary command voltage.

The non-inverting input for the operational amplifier 72 is held at a positive reference voltage value by a voltage derived from a direct current supply voltage applied to terminal 62. This supply voltage is regulated by a voltage regulator 64 so as to present a constant input voltage to circuit node 66. As previously indicated, this voltage at circuit node 66 may be used as the voltage supply for the potentiometer 32.

Series resistances 68 and 73, coupled between the negative side of the voltage supply, herein shown as ground, and the regulated input voltage at circuit node 66 divide the input voltage to the reference value applied to the non-inverting input 70 of the amplifier 72.

Associated with the operational amplifier 72 is a compensation network 74 comprising resistors 77 and 79 connected in series with an RC network comprising resistor 81 and capacitor 83 to a circuit node 76. The junction between the resistors 77 and 79 at circuit node 85 is connected to ground over a resistor 87 in series with a capacitor 89. A compensation network of the type described will be recognized as a lag-lead network. While a lag-lead commmpensation network is preferred for the practice of the present invention, those skilled in the art will recognize that simple lag, simple lead or higher order lead-lag networks can also function in the present invention.

The output of the operational amplifier 72 appearing at node 76 is a voltage signal determined by the current through the resistor 54 resulting from the voltage output of the buffer 50 summed with the current through the resistor 60 determined by the command voltage. The compensation network conducts whatever current is required to flow between the output circuit node 76 and the input circuit nodes 75 and 56 to maintain the voltage at the inverting input substantially equal to the reference voltage at the non-inverting input to the amplifier 72.

Regarding the sum of currents at circuit node 56, it is to be understood that the polarity of the voltage applied to the potentiometer 32 is such that a positive-going input command signal will produce by reason of the operation of the circuit of FIG. 4, a negative-going slider output signal. Thus, the circuit of FIG. 4 will drive the armature 20 and therefore the potentiometer 32 in whatever direction is required to equalize the input command signal reaching node 56 with the negative of the potentiometer feedback signal reaching node 56.

The output of the operational amplifier 72 is applied to a circuit node 78 and from there over a resistance 86 to the non-inverting input 88 of an operational amplifier 90. This second operational amplifier establishes threshold voltages to its non-inverting input 88 from series resistances 86 and 136 connected between circuit node 78 and the output of amplifier 90 at circuit node 134. The amplifier 90 has conventional biasing means not shown. The output of the amplifier 90 to circuit node 134 is fed back over resistance 138 to its inverting input 128. The inverting input 128 is connected to ground at node 132 over a capacitor 130. Resistances 124 and 126 form a voltage divider establishing a reference voltage for charging and discharging the capacitor 130 by means of feedback resistor 138.

The output of amplifier 90 appearing at circuit node 134 is passed over a zener diode 140 in series with resistance 142 to the base of an NPN transistor 144. The base for this transistor is strapped to ground over a resistance 143. A resistance 148 is connected between the emitter and the base of transistor 144. The emitter of transistor 144 is also directly connected to the base of an NPN transistor 146 having an emitter connected to a grounded circuit node 152. The resistance 150 connects the grounded circuit node 152 to the base of transistor 146.

The transistors 144 and 146 have their collectors joined in common to a circuit node 154 to which is connected the coil lead 18b for the solenoid coil 14. The transistors 144 and 146 together with the resistors 148 and 150 are available as a single darlington transistor unit from Motorola Inc. under Part No. MJ3000.

In a generally parallel circuit, the output of the amplifier 72 is applied over a resistance 80 to the inverting input 82 of an operational amplifier 84. A threshold voltage value applied to the non-inverting input 96 of the operational amplifier 84 is derived from a voltage divider comprising resistors 92 and 94 connected in series between the voltage input at circuit node 66 and ground. The inverting input 82 is connected to ground over a capacitor 104. The output of the amplifier 84 which appears at circuit node 98 is fed back to the inverting input 82 over a resistance 100. The output appearing at circuit node 98 is also connected over resistance 102 to the non-inverting input 96. The operational amplifier 84 receives conventional biasing, not shown.

The output of the amplifier 84 is passed over a zener diode 106 in series with a resistance 108 to the base of an NPN transistor 110. The base of the transistor 110 is also strapped to ground over resistance 109. The emitter of transistor 110 is directly connected to the base of a second NPN transistor 112 and is also connected over resistor 114 to the base of transistor 110.

Transistor 112 has its emitter grounded at circuit node 118, such emitter also connected to the base of transistor 112 over a resistor 116. The collectors of transistors 110 and 112 are connected in common to a circuit node 120 to which is also connected the lead 16b for the solenoid coil 12.

Again, the transistors 110 and 112, together with the resistors 114 and 116, are available as a single darlington transistor circuit from Motorola, Inc. It will be noted that the leads 16a and 18a for the solenoid coils 12 and 14 are both connected to the input supply terminal 62. It will be further noted that the solenoid coil 12 has a diode 122 across its terminals and likewise the solenoid coil 14 has a diode 156 across its terminals.

The operation of the circuit of FIG. 4 will now be described.

Tracing the input command signal, it can be seen that the input command signal is applied to resistance 60 and the feedback signal from the potentiometer slider is applied to resistance 54 via the input buffer 50. This provides an error signal in the form of electrical current through network 74 which results in an amplifier voltage at the output of amplifier 72. This voltage is applied to the input resistances 80 and 86 for the operational amplifiers 84 and 90. The amplifier 84 is part of a controlled oscillator comprising the resistance 80, the capacitor 104, the resistances 92, 94, 100 and 102 together with the operational amplifier 84. This oscillator produces a square wave at the circuit node 98, the pulse width of such square wave being controlled by the charge and discharge rates for the capacitor 104. The square wave is applied to a power driver comprising the zener diode 106, resistance 108, resistance 109 and the transistors 110 and 112 which drive the solenoid coil 12. Assuming no initial charge on the capacitor 104, the output of the amplifier 84 will be in a "high" state which is slightly lower than the voltage supplied to circuit node 66. Resistors 102, 92 and 94 act to set a corresponding high voltage level on the non-inverting input 96 to the amplifier 84. Since the input 96 is then positive with respect to the inverting input 82, the amplifier 84 is latched on and the capacitor 104 charges by means of the resistor combination 80 and 100. When the capacitor voltage reaches the threshold voltage level of the input 96, the amplifier 84 goes regeneratively to a "low" state. As a consequence, the capacitor 104 discharges by way of the resistor combination 80 and 100. When the capacitor 104 reaches the low level set by the resistors 92, 94 and 102, the output of the amplifier 84 goes high regeneratively whereupon the cycle of operation repeats.

It is to be noted that the voltage level applied to the resistance 80 by reason of an error signal from the amplifier 72 determines what charging and discharging currents resistor 80 will supply to the capacitor 104. When the error voltage is high, charging current will enter the top plate of the capacitor 104 and the capacitor 104 will charge fast and discharge slow. Conversely, a low error voltage to the resistance 80 will cause the capacitor 104 to charge slowly and discharge rapidly. The result is a roughly inversely proportional transfer characteristic between the output duty of the amplifier 84 and the input voltage received from the amplifier 72. In short, when the error signal from the amplifier 72 is high, the amplifier 84 spends a greater percentage of its operating time in a low state than in a high state. In consequence, the combination of transistors 110 and 112, which is being triggered on and off intermittently, spends more time in the "off" state than in the "on" state. As a further consequence, the solenoid coil 12, while receiving pulsed voltage from the source 62 has a relatively low average current therethrough. By circuit design, the frequency of the pulsed output from the amplifier 84 is too high for the solenoid to respond to individual pulses and, since the diode 122, cooperating with the coil inductance, provides a filtering action, the coil current through the solenoid 12 will be a direct current with little ripple being present.

The operation of the amplifier 90 is similar in character to that of the amplifier 84 except that the error signal is applied to the non-inverting input 88 over the resistance 86. Thus, the operational amplifier 90, together withh the resistances 138, 136, 124 and 126 as well as the capacitor 130, functions as a controlled oscillator receiving the error signal. The amplifier strives to hold the voltage at the inverting input 128 substantially equal to the voltage of the non-inverting input 88. Accordingly, as the error signal passing through the resistance 86 to the non-inverting input 88 changes, the voltage at the inverting input 128 also changes. The time interval for the controlled oscillator associated with the amplifier 90 changes in relation to the time required for the capacitor 130 to charge to the voltage of the inverting input 128. During the time the capacitor is charging, the output of the amplifier 90 is in a high state and during the time the capacitor is discharging, the output is in a low state.

Accordingly, when the error signal is low, the voltage on the non-inverting input 88 is held low and the capacitor charges in a short time interval. Correspondintly, when the error signal is high, the voltage at the non-inverting input is held high and the capacitor chargers over a longer period of time.

Figure 5:
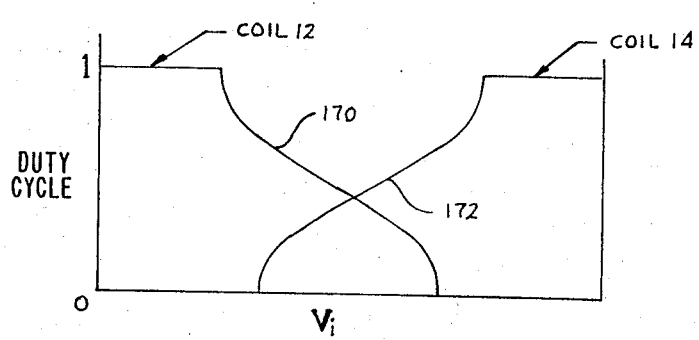
FIG. 5 illustrates the transfer characteristic of the switching mode drivers of the preferred embodiment.

If one defines the output duty cycle for each of the two amplifiers 84 and 90 as a ratio of its "on" time to its controlled oscillator time interval, it is possible to express such duty cycle as a function of the error signal. Such relationship is depicted in FIG. 5 wherein the horizontal axis represents the error signal $V_1$ from the amplifier 72, i.e. the input $V_t$ to the amplifiers 84 and 90. The vertical axis represennts duty cycle. The first curve 170 depicts the duty cycle as experienced by the coil 12 and the second curve 172 depicts the duty cycle as experienced by the coil 14. When the error signal is very low, the amplifier 84 remains continuously "on" because the capacitor 104 is unable to charge to the threshold voltage on the nonn-inverting input 96. Likewise, the amplifier 90 remains continuously "off" because the capacitor 130, being coupled in parallel with the resistance 126, is unable to discharge to a level low enough to turn the amplifier "on". Similarly, when the error signal is high, the capacitor 104 is unable to discharge and, accordingly, the transistor 84 remains continuously in an "off" state. Also, when the error signal is high, the non-inverting input 88 to the amplifier 90 is held correspondingly high and the capacitor 130 is unable to charge sufficiently to turn the amplifier off.

Between these extremes the curves cross each other symmetrically at a crossover or null point where equal signals are applied to the coils. With suitable damping associated with the coils 12 and 14, as previously described, a stable armature position can be reached.

It is to be emphasized that the coils 12 and 14 are receiving pulsating signals at the rates established by the controlled oscillators associated with the respective amplifiers 84 and 90. In the preferred mode of operation, the pulse frequencies are too high for the solenoids to respond to individual pulses. Instead, the armature 20 reacts only to the average currents passing through the respective coils 12 and 14.

In operation, the circuitry of FIG. 4 acts to drive the armature to whatever position, within the limits of the armature movement available, is required to position the potentiometer 32 so as to nullify differences between the feedback signal and the command signal as seen by the amplifier 72. If the error signal received from the amplifier 72 is low, a greater duty cycle is imposed on the power driver for the coil 12 and, accordingly, the armature 20 experiences a force acting to the left as it appears in FIG. 2.

Correspondingly, if the error signal received from the amplifier 72 is high, the greater duty cycle is imposed on the power driver for the coil 14 and the armature 20 experiences a force acting to the right as it appears in FIG. 2.

While the preferred ambodiment is described as utilizing a potentiometer to produce the feedback signal, those skilled in the art will recognize that typical applications of the present invention may involve, in lieu of a potentiometer directly following armature position, a feedback signal derived from any suitable sensor for monitoring a condition controllable by apparatus driven by the armature to meet a condition commanded by the command signal.

It is to be noted, of course, that the circuitry will cause the solenoid mechanism to exert whatever force is necessary, up to full duty cycle on one coil versus zero duty cycle on the other coil to drive the armature 20 toward a null position and likewise, when nullity is reached, will exert whatever force up to full duty cycle on one coil to retain the armature in the null position.

In the modification of FIGS. 6 through 12, the operating principles discussed above are applied to a solenoid servomechanism comprising a single coil operating against a single spring.

FIG. 6 is a section view of a rotary solenoid 200 assembled in a casing 205. The solenoid 200 comprises confronting stationary pole pieces or stators 202 and 204 press fitted into the casing 205. Ball bearings 206 and 208 press fitted into the respective pole pieces 202 and 204 rotatably support an output shaft 210 against axial movement. Press fitted or suitably keyed to the output shaft 210 is a rotor 212 best shown in FIG. 8.

A coil 216 surrounds the confronting pole pieces 202 and 204. The coil is preferably assembled in a conductive bobbin 217, which may be aluminum having surface anodization, and is preferably wrapped by a suitable insulating tape 219.

Referring to FIG. 9, it can be seen that the pole piece 202 comprises a generally cylindrical ferromagnetic body 224 from which project axially four equiangularly spaced segments 226. The pole piece 204 is of similar construction with four equiangularly spaced segments 227 aligned with and directly confronting the segments 226 in the pole piece 202.

The rotor 212, as best appears in FIG. 8, has four equiangularly spaced vanes 218, each of the vanes having a leading face 222 and a trailing face 220. It can be noted that the vanes 218 subtend substantially the same angles as subtended by segments 226 on the pole piece 202 and the like segments 227 on the pole piece 204.

As appears in FIG. 6, a spirally coiled spring 238 has its innermost convolution affixed to the shaft 210. The outermost convolution has a tongue 237 struck from the body thereof and hooked about an ear 236. The ear 236 is one of several ears struck upwardly from a plate 230 to form a cage receiving the spring 238. The spring 238 is so hooked to the ear 236 that the shaft 210 receives a counter-clockwise bias as it appears in FIG. 7.

As shown in FIG. 10, the shaft 210 has a bumper member 242 keyed thereon. A bushing 244 secured by a press fit to the shaft 210 retains the bumper axially on the shaft 210.

The rotational movement of the shaft 210 is restricted by an annular cage member 240 which has an interior opening 245 defining the limits of shaft movement. As above indicated, the shaft 210 is biased in a counter-clockwise direction as it appears in FIG. 7. The bias of the shaft is similarly in a counter-clockwise direction as it appears in FIG. 10.

As shown in FIG. 9, the pole piece 202 has mounting studs 228 projecting therefrom. Similar studs 229 project from the pole piece 204 but are not seen in detail because one is concealed by the shaft 210 and the other has been removed by the sectioning. The studs 228 enter the body of the cage member 240 to locate the cage member and prevent its rotation relative to the pole pieces 202 and 204.

The alignment between the bumper member 242 and the cage member 240 is such that the bias of the spring 238 normally supports the armature with respect to the pole piece 202 as shown in FIG. 7. Accordingly, the leading edges 222 of the rotor vanes 218 are supported in positions of partial entry into air gaps between the confronting segments of the pole pieces 202 and 204. Should the coil be energized with a sufficient current, the rotor 212 will be pulled in a clockwise direction as it appears in FIG. 7 throughout the angle of movement allowed by the opening 245 and the cage member 240. The construction of the opening 245 is such that the several rotor vanes can advance more fully into the air gaps between the stator segments but, due to the limited motion allowed by the opening 245, cannot advance entirely through such air gaps. In other words, the rotor vanes can advance to positions of lower magnetic reluctance but cannot advance into the stator air gaps so far that the stator segments are no longer capable of generating a torque acting upon the rotor 212.

An advantage to this type of rotary solenoid construction is that the torque generated in the rotor 212 by reason of a constant current passing through the coil 216 remins substantially constant from the beginning of the stroke to the end of the stroke. The nature and operation of a solenoid similar in principle to the one illustrated in FIGS. 6 through 9 hereof is more fully discussed in U.S. Pat. No. 3,753,180.

For operation as a servomechanism in accordance with the present invention, a position sensing device such as a potentiometer 250 is assembled to the structure as appears in FIG. 11. For supporting the potentiometer 250 an extension tube 253 is assembled to the casing 205 by suitable press fit, the extension 253 encircling the aforementioned cage member 240. The potentiometer 250 is assembled on an end cap 251 which is held in closing relationship to the extension 253 by means of a band 255.

Centrally fitted into the end cap 251 is a ball bearing 252 which receives the rotary solenoid shaft 210. Applied circularly on the innerface of the end cap 251 is a resistance element 254. A voltage difference is applied to the resistance element by means of conductors 256 and 258.

The resistance element 254 is wiped by a center tap member 260 supported nonrotatably to a collar 264 pressed on the reduced diameter section of the shaft 210. The collar 264 is also wiped by a contact 262 which relays the center tap voltage to a conductor 266.

It is apparent that the potentiometer conductors 256 and 258 create a voltage gradient along the circular length of the resistance element 254. It is further apparent that the potentiometer lead 266 will possess whatever voltage is tapped by the wiper 260.

Referring to FIG. 10, it can be noted that the bumper 242 limits the rotary movement of the solenoid mechanism to only a few degrees such as 30°. Accordingly, the spread of voltage values available at the potentiometer conductor 266 will be a rather limited spread not necessarily representative of the entire potential drop along the resistance element 254.

The solenoid assembly 200 is adapted for use with the potentiometer 250 and in conjunction with the electronic circuit illustrated in FIG. 12. Having reference to the electronic circuit of FIG. 4, it will be recalled that circuit had operational amplifiers 84 and 90 connected to provide symmetrically opposite duty cycles for the coils 12 and 14 of the preferred embodiment, such duty cycles being illustrated in FIG. 5. The electronic circuitry of FIG. 12 is the same as that of FIG. 4 with the exception that the operational amplifier 90 and all circuit components associated therewith including the coil 14 have been eliminated. To avoid unnecessary redundancy in the description of the modified circuit of FIG. 12, reference numbers used in FIG. 4 have been repeated in FIG. 12 wherein similar parts perform similar functions. It will be noted however that the electronic circuitry of FIG. 12 has been attached to the coil 216 of this modification.

The rotary solenoid of this modification is further connected to the circuitry of FIG. 12 by attachment of the potentiometer lead 266 to the potentiometer slider connection to the input buffer 50. A voltage source for operating the circuit of FIG. 12 is applied to the circuit node 62 illustrated in FIG. 12. An input command voltage of any arbitrary value is applied to the conductor 58 shown in FIG. 12.

The circuit of FIG. 12 cooperates with the spring 238 to drive the rotor 212 and the potentiometer 250 coupled thereto in whatever direction and through whatever angle within design limitations is required to equalize the input command current as seen by the amplifier 72 in FIG. 12 with the feedback current from the potentiometer seen by the same amplifier. Noting that the potentiometer voltage is of a polarity opposite to the command voltage, it can be seen that the circuit of FIG. 12 acts to cause the potentiometer feedback signal and the input command signal to nullify each other at the circuit node 56 appearing in FIG. 12.

The manner in which the circuit of FIG. 12 operates is best discussed in reference to the transfer curve 170 appearing in FIG. 5. This transfer curve was initially discussed in relation to the preferred embodiment but is also representative of the transfer characteristic provided by the circuit of FIG. 12 when operated in association with the solenoid structure shown in FIGS. 6 through 11.

In relating the transfer curve 170 to FIG. 12, the symbol $V_t$ appearing in FIG. 5 represents the output of the amplifier 72 appearing in FIG. 12 and thus represents the error signal received over the resistor 80 by the inverting input of the amplifier 84. As the curve 170 indicates, when the error signal is low the duty cycle imposed upon the transistors 110 and 112 is a maximum (duty cycle = 1) and the coil 216 acts to rotate the rotor 212 in a clockwise direction. This adjusts the potentiometer 250 so as to reduce the error signal seen by the amplifier 72 in FIG. 12. As the error signal reduces, the pulse modulated signal reaching the transistors 110 and 112 drops to a lower duty cycle as shown by the curve 170 in FIG. 5, the average current through the coil 216 dropping until the magnetic force acting on the rotor 212 is substantially equal and opposite to the restoring torque of the spring 238. When this condition is reached, damping such as provided by the compensation network 74 and conductive bobbin 217 produces a stable condition.

Should the error in the position of the rotor 212 be such as to cause the amplifier 72 in FIG. 12 to produce a high output $V_i$, the current through the coil 216 will be too small to oppose the spring 238. The rotor 212 will then be driven by the spring 238 to correct the error in the position of the rotor 212, the spring driving the rotor 212 in the counterclockwise direction until such time as the potentiometer feedback signal is adjusted to cause the circuit of FIG. 12 to provide a current through the coil 216 which is adequate to produce a magnetic field acting of the armature 212 with sufficient force to oppose the restoring torque of the spring 238.

Referring back to the preferred embodiment as well as the modification above discussed, obvious extrapolations are that the circuit desired in reference to FIG. 4 can be applied to dual coil devices whether armature motion is linear or rotary, and circuits such as shown in FIG. 12 can be applied to single coil devices also whether linear or rotary. For example, the dual coil structure of FIG. 1 can be caused to function as a single coil structure by the elimination of one of the coils 12 and 14 and its associated driver circuitry. Likewise, the single coil structure of FIG. 6 can be converted to a double coil structure in a rotary solenoid of the general type illustrated in FIGS. 6 through 10 by utilizing a first coil encircling the pole piece 202 and a second coil encircling the pole piece 204, such first and second coils being provided with independent flux paths.

Regarding the modification of FIGS. 6 through 10, it will be quickly recognized by those skilled in the art that, although the modification utilizes a relatively small rotary motion, the extend of rotary motion is easily increased by reducing the number of vanes in the rotor 212 and correspondingly the number of stator segments in the pole pieces 202 and 204 while at the same time increasing the angles subtended by the vanes and stator segments which are retained in the design.

Although this invention has been described in its preferred forms with a certain degree of particularity, it is to be understood that the present disclosure of the preferred forms has been made only by way of example and that numerous changes in the details of construction and the combination and arrangement of parts may be resorted to without departing from the spirit and scope of the invention as hereinafter claimed.

Having thus described my invention, I claim:

1. In a solenoid control mechanism, a movably supported armature, bias means urging said armature in a first direction, electromagnetic means energizable to move said armature in opposition to said bias means, said electromagnetic means producing a magnetic field attracting said armature into a region in which the attractive force of said magnetic field does not increase, position sensor means to sense the position of said armature or a condition controlled by said armature and provide a first signal representing present armature position, command means providing a second signal directing an armature position or a condition controlled thereby, comparison means comparing said first and second signals and providing an error signal having a magnitude representing a difference between said first and secon signals, a driver circuit coupled to drive said electromagnetic means, control means coupled to said driver circuit and receiving said error signal, said control means generating a pulse modulated signal applied to said driver circuit, said control means including means controlling the pulse width of said pulse modulated signal in relation to the magnitude of said error signal thus to control the duty cycle of said driver circuit.

2. The mechanism of claim 1 wherein said electromagnetic means when energized produces a magnetic field attracting said armature into a region in which the attractive force of said magnetic field diminishes.

3. In a solenoid control mechanism, a movably supported armature, first electromagnetic means to attract the armature in one direction, second electromagnetic means to attract said armature in an opposite direction, first control means for said first electromagnetic means and second control means for said second electromagnetic means, said first and second control means adapted to receive a common input signal, first driver means coupled to said first control means to drive said first electromagnetic means, second driver means coupled to said second control means to drive said second electromagnetic means, each of said first and second control means comprising an oscillator circuit including an operational amplifier having respectively inverting an non-inverting inputs and having an output, each of said first and second control means having feedback means connected between the output and the inverting input of its operational amplifier, voltage supply means, said voltage supply means applying a threshold voltage to the inverting input of said first control means, said voltage supply means applying a threshold voltage to the non-inverting input of said second control means, each of said first and second control means including capacitive means connected between the inverting input of its operational amplifier and one side of said voltage supply means, said first control means decreasing the duty cycle of said first driver means as said input signal increases and said second control means increasing the duty cycle of said second electromagnetic means as said input signal increases.

4. The solenoid control mechanism of claim 3 wherein said first and second electromagnetic means each attract said armature toward a region thereof in which the attraction for said armature does not increase.

5. In a solenoid control mechanism, a movably supported armature, first electromagnetic means to attract said armature in one direction, second electromagnetic means to attract said armature in an opposite direction, means responsive to armature position to provide an error signal, first control means for said first electromagnetic means and second control means for said second electromagnetic means, said first and second control means each adapted to receive said error signal, said first control means translating said error signal to a pulse modulated signal in which the pulse width increases as the error signal increases, said second control means translating said error signal to a pulse modulated signal in which the pulse width decreases as said error signal increases, there being an intermediate value of said error signal at which said first and second control means translate said error signal to pulse modulated signals having substantially the same pulse width, first driver means coupled to said first control means and receiving the pulse modulated signal of said first control means to drive said frist electromagnetic means, second driver means coupled to said second control means and receiving the pulse modulated signal of said second control means to drive said second electromagnetic means.

6. In a control mechanism, a movable member, first electromagnetic means to bias said member in one direction, second electromagnetic means to bias said member in an opposite direction, third means responsive to the position of said member and providing a control signal, first control means for said first electromagnetic means and second control means for said second electromagnetic means, said first and second control means each receiving said control signal, said first control means translating said control signal to a pulse modulated signal in which the pulse width increases as the control signal increases, said second control means translating said control signal to a pulse modulated signal in which the pulse width decreases as said control signal increases, first driver means coupled to said first control means and receiving the pulse modulated signal of said first control means to drive said first electromagnetic means, second driver means coupled to said second control means and receiving the pulse modulated signal of said second control means to drive said second electromagnetic means.

7. In a solenoid servomechanism comprising a movable armature, first electromagnetic means energizable to bias said armature in one direction and second electromagnetic means energizable to bias said armature in an opposite direction, command means providing a first signal directing a position for said armature or a condition controlled by positioning said armature, sensor means to sense the position of said armature or the condition controlled thereby and providing a second signal indicating said position or condition, comparison means receiving and comparing said first and second signals, said comparison means providing a control signal representing a difference between said first and second signals, the improvement comprising a first driver circuit to drive said first electromagnetic means, first control means coupled to said first driver circuit, said first control means including a first operational amplifier having respectively inverting and non-inverting inputs, said first control means including first capacitive means coupled to the inverting input of said first operational amplifier, said control signal applied over a first resistance to the inverting input of said first operational amplifier, said first operational amplifier having an output coupled to said first driver circuit, a second driver circuit to drive said second electromagnetic means, second control means coupled to said second driver circuit, said second control means including a second operational amplifier having respectively inverting and non-inverting inputs, said second control means having second capacitive means coupled to the inverting input of said operational amplifier, said control signal applied over a second resistance to the non-inverting input of said second operational amplifier, said second operational amplifier having an output coupled to said second driver circuit.

* * * * *

UNITED STATES PATENT OFFICE
CERTIFICATE OF CORRECTION

Patent No. 3,870,931  Dated March 11, 1975

Inventor(s) John L. Myers

It is certified that error appears in the above-identified patent and that said Letters Patent are hereby corrected as shown below:

Title page, item [73], "Sun Chemical Corporation, New York, N.Y." should read ---Leeds Inc., Dayton, Ohio--- .

Column 1, line 60, "solennoid" should read ---solenoid--- .

Column 2, line 61, "encapes" should read ---escapes--- .

Column 4, line 36, "commpensation" should read ---compensation---

Column 5, line 60, after "input", insert ---voltage--- .

Column 6, line 65, "withh" should read ---with--- .

Column 7, line 15, "correspondintly" should read
---correspondingly--- .

Column 7, line 24, "V$_1$" should read ---V$_i$--- .

Column 7, line 26, "represennts" should read ---represents--- .

Column 7, line 32, "nonn-inverting" should read
---non-inverting--- .

Column 8, line 4, "ambodiment" should read ---embodiment--- .

Column 9, line 34, "remins" should read ---remains--- .

Column 11, line 36, "extend" should read ---extent--- .

UNITED STATES PATENT OFFICE
CERTIFICATE OF CORRECTION

Patent No. 3,870,931  Dated March 11, 1975

Inventor(s) John L. Myers  Page 2

It is certified that error appears in the above-identified patent and that said Letters Patent are hereby corrected as shown below:

Column 11, line 66, "secor" should read ---second--- .

Column 12, line 26, "an" (first occurrence) should read ---and---

Signed and sealed this 1st day of July 1975.

(SEAL)
Attest:

RUTH C. MASON  
Attesting Officer

C. MARSHALL DANN  
Commissioner of Patents  
and Trademarks